(12) United States Patent
Kastinger et al.

(10) Patent No.: US 9,071,089 B2
(45) Date of Patent: Jun. 30, 2015

(54) BUSHING FOR A DRIVE UNIT AND DRIVE UNIT

(75) Inventors: Guenter Kastinger, Gaggenau-Sulzbach (DE); Norbert Wegner, Buehl (DE); Alexander Dudek, Offenburg (DE); Markus Petry, Buehl (DE); Ottmar Seiler, Ottersweier-Unzhurst (DE)

(73) Assignee: Robert Bosch GmbH, Stuttgart (DE)

( * ) Notice: Subject to any disclaimer, the term of this patent is extended or adjusted under 35 U.S.C. 154(b) by 268 days.

(21) Appl. No.: 13/508,093

(22) PCT Filed: Sep. 20, 2010

(86) PCT No.: PCT/EP2010/063798
§ 371 (c)(1),
(2), (4) Date: Jul. 18, 2012

(87) PCT Pub. No.: WO2011/054580
PCT Pub. Date: May 12, 2011

(65) Prior Publication Data
US 2012/0275733 A1 Nov. 1, 2012

(30) Foreign Application Priority Data

Nov. 6, 2009 (DE) .......................... 10 2009 046 447

(51) Int. Cl.
*F16C 33/10* (2006.01)
*F16C 23/02* (2006.01)
(Continued)

(52) U.S. Cl.
CPC ................. *H02K 7/081* (2013.01); *B60S 1/166* (2013.01); *F16C 23/10* (2013.01)

(58) Field of Classification Search
CPC ...... F16C 23/10; F16C 33/04; F16C 33/1065; H02K 7/081; B60B 1/32; B60B 1/34; B60B 1/40; B60B 1/66; B60B 1/345; B60B 1/349

USPC ......... 384/271, 276, 280, 283, 286, 290, 296; 15/250.13, 250.21, 250.3, 250.31, 15/250.222, 250.34
See application file for complete search history.

(56) References Cited

U.S. PATENT DOCUMENTS 3,494,676 A * 2/1970 Compton ....................... 384/222
3,499,183 A * 3/1970 Parsons ......................... 384/276
(Continued)

FOREIGN PATENT DOCUMENTS

FR        2748074      10/1997
GB        939461 A  * 10/1963  ............... B60Q 1/26
(Continued)

OTHER PUBLICATIONS

PCT/EP2010/063798 International Search Report dated Dec. 14, 2010 (Translation and Original, 6 pages).

*Primary Examiner* — Marcus Charles
(74) *Attorney, Agent, or Firm* — Michael Best & Friedrich LLP

(57) ABSTRACT

The invention relates to a bushing (30) for a drive unit, in particular an eccentric bushing (30) for a wiper drive of a windshield wiper, having an axial mounting section (32) and a radial flange section protruding therefrom, wherein the bushing (30) can be mounted having the mounting section (32) and having the flange section in/on a component, wherein the bushing (30) has a relief channel (322, 342) such that a fluid can flow through the relief channel (322, 342) upon mounting of the bushing (30) in/on the component and/or in a mounted state on/in the component. The invention furthermore relates to a drive unit, in particular a wiper drive for a windshield wiper of a motor vehicle, having a bushing (30) according to the invention.

10 Claims, 5 Drawing Sheets

(51) Int. Cl.
  *F16C 33/04* (2006.01)
  *F16C 23/10* (2006.01)
  *H02K 7/08* (2006.01)
  *B60S 1/16* (2006.01)

(56) References Cited

U.S. PATENT DOCUMENTS 4,369,387 A * 1/1983 Haar et al. .................... 310/83
5,319,851 A * 6/1994 Ikezawa et al. ......... 29/898.055
5,675,862 A * 10/1997 Reinl ........................ 15/250.31
5,853,248 A * 12/1998 Dalessandro ................ 384/192
5,980,147 A * 11/1999 Journee ........................ 403/119
6,177,742 B1    1/2001 Lauk et al.
6,467,985 B1 * 10/2002 Daenen .......................... 403/79
6,588,047 B2 * 7/2003 Burkard et al. .............. 15/250.3
6,609,892 B1 * 8/2003 Kreul et al. ................ 416/134 R
7,708,466 B2 * 5/2010 Hsieh et al. .................... 384/286
8,419,489 B2 * 4/2013 Tsunekawa et al. ............ 440/83

FOREIGN PATENT DOCUMENTS

GB    1493854    11/1977
WO    2004085215    10/2004

* cited by examiner

BUSHING FOR A DRIVE UNIT AND DRIVE UNIT

BACKGROUND OF THE DESCRIPTION

The invention relates to a bushing for a drive unit, in particular an eccentric bushing for a wiper drive of a windshield wiper. The invention furthermore relates to a drive unit, in particular a wiper drive for a windshield wiper of a motor vehicle.

The German patent publication DE 103 13 734 A1 discloses an electric drive unit for windshield wipers of a motor vehicle, said drive unit comprising an electric motor, which drives a worm wheel of a gear assembly via a drive shaft with a worm. The worm wheel is mounted in an eccentric bushing, which in turn is seated in a stepped mounting hole of a gear assembly housing. Corresponding to the stepped mounting hole in the housing, the eccentric bushing comprises in addition to a flange section a correspondingly stepped mounting section, which has a first press region adjacent to the flange section, an intermediate region and a second press region at the free longitudinal end section. In order to mount the eccentric bushing, the two press regions are press fitted into corresponding press regions of the stepped mounting hole, wherein a collar of the flange section of the eccentric bushing comes flatly to rest at an edge of the mounting hole.

The use of an eccentric bushing is therefore necessary because a distance between the drive shaft and the worm wheel must be precisely set in order on the one hand to be able to reliably and permanently transmit high torques and on the other hand to be able to fulfill the requirements with regard to noise emissions. A problem with the mounting of the eccentric bushing is that the intermediate region is designed in such a way that in the mounted state, the same is disposed without contact to the mounting hole and therefore an air volume is enclosed in said mounting hole between the two press regions. During the mounting process a rapid compressing action of this air volume can occur, which produces a force opposite to the mounting direction of the eccentric bushing. This opposing force can be so great that the eccentric bushing can no longer be correctly mounted. In the case of a mounted eccentric bushing, a further problem is that water can seep inwardly into the housing through capillaries formed between the collar of the flange section and the flat contact surface on the gear assembly housing.

SUMMARY OF THE INVENTION

The aim of the invention is to provide an improved bushing, in particular an improved eccentric bushing, as well as an improved drive, in particular an improved wiper drive for a windshield wiper. In so doing, a mounting of the bushing shall be able to take place quickly and reliably. In addition, the bushing in the mounted state shall not provide the opportunity for water to get into a mounting region of said bushing.

The aim of the invention is met by means of a bushing for a drive unit, in particular an eccentric bushing for a wiper drive of a windshield wiper in accordance with the invention; and by means of a drive unit, in particular a wiper drive for a windshield wiper of a motor vehicle in accordance with the invention.

The bushing according to the invention has a mounting section and a flange section protruding therefrom, wherein the bushing can be mounted in/on a component by means of the mounting section and the flange section. The bushing thereby has a relief channel such that a fluid can flow through the relief channel upon mounting of the bushing in/on the component and/or in a mounted state on/in the component. Such a component can, e.g., be a housing of a drive or a drive unit, in particular an electric drive unit for a windshield wiper, preferably a gear assembly housing.

In embodiments of the invention, the relief channel is provided in an outer face of the mounting section and/or in a collar of the flange section facing said mounting section. The relief channel of the flange section of the bushing can thereby be a substantially radial capillary relief channel, through which a capillary between the collar of the bushing and the component can be drained in the mounted state of the bushing in a mounting hole of the component. In addition, the relief channel of the mounting section can be a substantially straight pressure relief channel, which vents a space between the bushing and the component when the bushing is being mounted in the mounting hole of the component.

By means of the relief channel according to the invention, it is possible to drain one or a plurality of capillaries, which can develop between the component and the collar of the bushing that rests flatly against said component; and therefore no water can travel inwardly across the mounting hole into said component. In addition, no highly compressed volumes of air arise anymore, which work against a press-fit operation of the bushing into the mounting hole. Furthermore, an air volume enclosed between the bushing and the component can no longer build up a positive or negative pressure due to temperature changes, whereby the drawing in of water is reliably prevented and changes in the oil distributions are avoided. In total, a more reliable and more robust press-fit operation of the bearing into the component results, wherein the bushing demonstrates a better behavior in the press-fitted state.

In embodiments of the invention, a fluid connection between two spaces can be made by means of the relief channel during and/or after the mounting of the bearing in the component. The first space is thereby located between the bushing and the component, wherein this space is preferably formed from the mounting hole for the bushing or from a contact surface of the component for the collar of the flange section of the bushing and the bushing itself. The second space adjoins with either an inner face of the component or the outer face thereof, in particular with a surrounding area, i.e. the environment.

An annular channel, which is in fluid connection with the relief channel, can be provided in embodiments of the invention in the collar or in the mounting section adjoining said collar. The relief channel of the mounting section can be provided in a contact region, in particular in a press region, of the mounting section with the component, wherein the relief channel preferably runs substantially parallel to the longitudinal direction of said mounting section. The respective relief channel is preferably a groove carved out of the material of the bushing or a recess introduced into the material of said bushing.

In embodiments of the invention, the mounting section can further have a first press region adjacent to the flange section and a second press region on the free longitudinal end section thereof, which has a smaller diameter than the first press region, wherein the second press region has the relief channel, which preferably extends over the entire length of the second press region. In this case, the relief channel extends from a free longitudinal end of the second press region into an intermediate region of the mounting section, which is configured between the first and second press region. Three relief channels are preferably provided in the second press region, whereas the collar preferably has six relief channels.

BRIEF DESCRIPTION OF THE DRAWINGS

The invention is explained in detail below using exemplary embodiments with reference to the accompanying drawings. In the drawings.

DETAILED DESCRIPTION

The invention is explained below in detail using an eccentric bushing, wherein the eccentric bushing has a flange section and a mounting section and is used in drives of windshield wipers. The invention is however not limited to such eccentric bushings, but can be used on the one hand with centric bushings and on the other hand also in another area.

Figure 1:
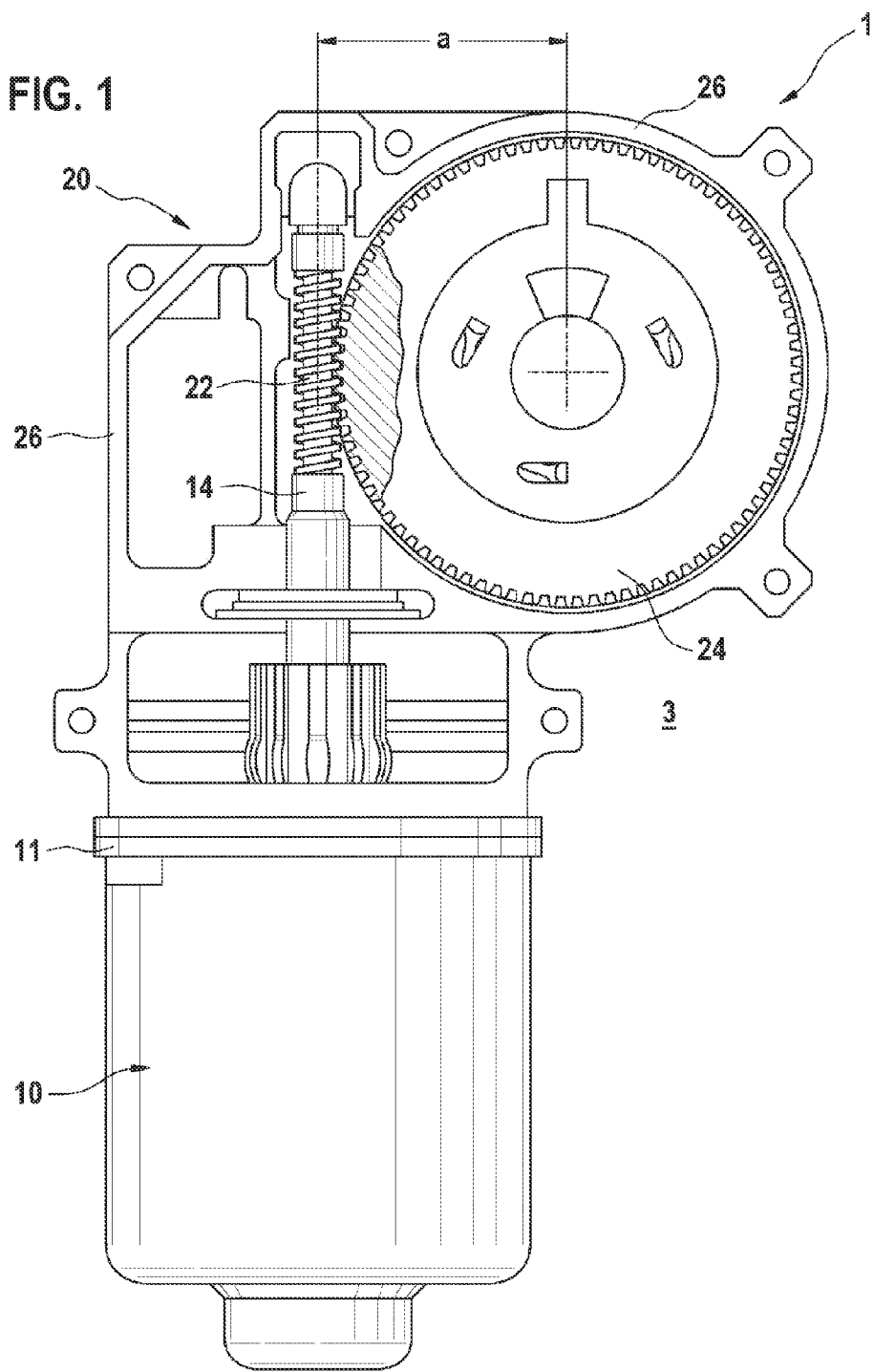
FIG. 1 shows a partially sectioned two dimensional top view of a drive unit according to the invention.
Figure 2:
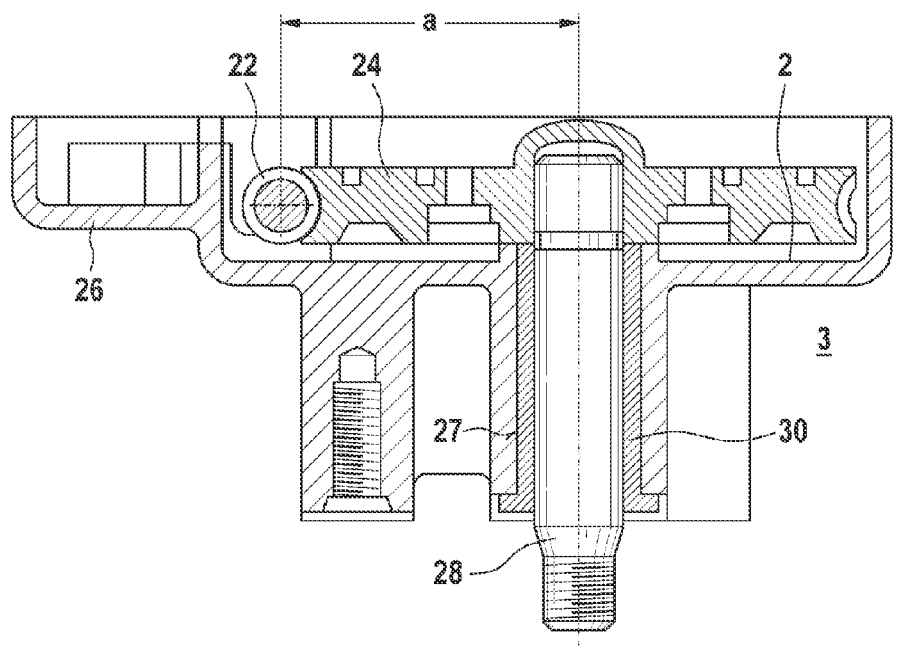
FIG. 2 shows a sectioned two dimensional side view through a gear assembly housing of the drive unit having a non-stepped mounting hole along a dashed/dotted line delineated in FIG. 1.
Figure 3:
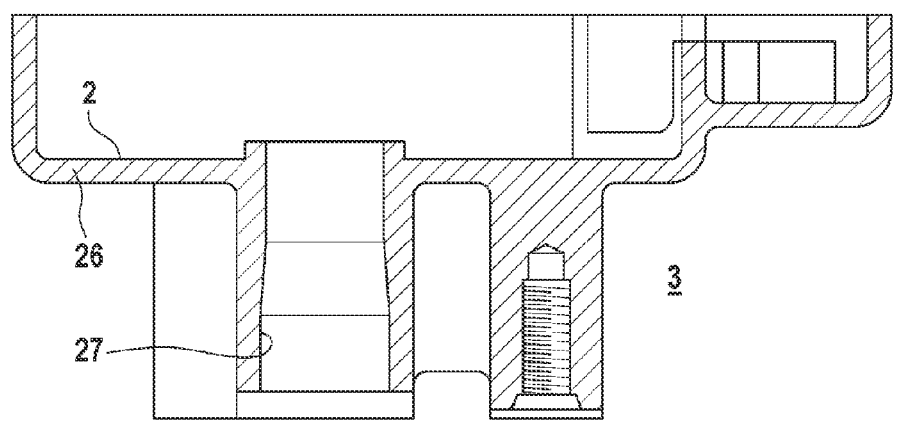
FIG. 3 shows a view of an alternative gear assembly housing having a stepped mounting hole for a bushing according to the invention, said view being analogous to FIG. 2 and rotated by 180 E.

The electric drive unit 1 for windshield wipers of a motor vehicle, which is depicted in FIGS. 1 to 3, comprises an electric motor 10 having a flange 12 on the face side, whereat a gear assembly housing 26 of a gear assembly 20 associated with the electric motor 10 is fastened. The electric motor 10 drives a drive shaft 14, on the free end section of which a worm 22 of the gear assembly 20 is provided. The worm 22 drives a worm wheel 24 mounted in the gear assembly housing 26 via a gearing. In order to be able to set an exact axial distance a between the drive shaft 14 of the worm 22 and an output shaft 28 of the worm wheel 24, the output shaft 28 is mounted in an eccentric bushing 30, which is press fitted into a mounting hole 27 of the gear assembly housing 26. The mounting hole 27 can have a constant diameter (FIG. 2) or is of stepped design (FIG. 3).

Figure 4:
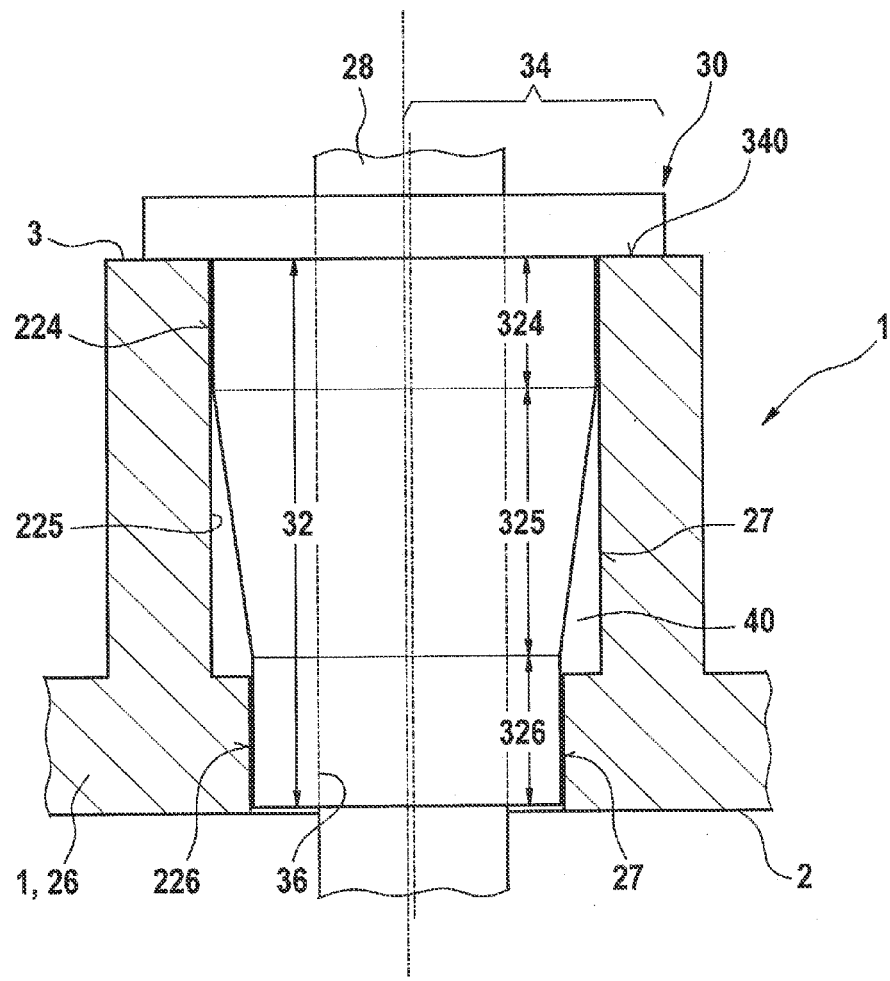
FIG. 4 shows an eccentric bushing according to the prior art in a mounting position in/on a component.

FIG. 4 shows an eccentric bushing 30 according to prior art for a stepped mounting hole 27. The eccentric bushing 30 has a radial flange section 34 and an axial mounting section 32 which is materially integrally designed with said flange section. In the mounted position, the flange section 34 rests with a collar 340 against an outer edge of the mounting hole 27. The collar 340 is thereby an outer face (340) of an outer face 320 of said flange section 34, said outer face (340) being directed towards the mounting section 32. The mounting section comprises substantially three longitudinal regions 324, 325, 326, wherein a first hollow cylindrical press region 324 directly adjoins the flange section 34. A preferably conical intermediate region 325 adjoins this first press region 324. Said intermediate region ultimately transitions into a second hollow cylindrical press region 326 at a free longitudinal end section of the mounting section 32, the outside diameter of the second press region 326 being smaller than the outside diameter of the first press region 324. The eccentric bushing 30 further comprises an eccentric borehole 36, which can have a roller bearing, e.g. made of plastic material, on the inside.

The mounting hole 27 in the gear assembly housing 26 is thus designed substantially in a complementary manner, wherein the mounting hole 27 has a press region 224 corresponding to the first press region 324 of the eccentric bushing 30, the inner diameter of which is slightly larger than the outside diameter of the first press region 324 of the eccentric bushing 30. Likewise a press region 226 is provided in the gear assembly housing 26 corresponding to the second press region 326 of the eccentric bushing 30, the inside diameter of said press region 226 being likewise slightly larger than the outside diameter of the second press region 326 of the eccentric bushing 30. If the eccentric bushing is press fitted into the mounting hole 27, interference fits, which are preferably impermeable to fluids, occur between the respective press regions 224, 324; 226, 326.

When press fitting such an eccentric bushing 30, air/fluid is compressed in a space 40 formed between the eccentric bushing 30 and the mounting hole 27. This can impress a considerable counter force on the press-fit operation so that said press-fit operation is at least made more difficult or cannot be carried out up to the stop of the collar 340 on the gear assembly housing 26. In addition, capillaries can later form in the collar region, which convey water/fluid inwardly to the mounting section 32. The water/fluid can then travel from said mounting section into the mounting hole 27 or can be sucked into the space 40 due to a negative pressure arising in said space 40 as a result of a drop in temperature.

Figure 5:
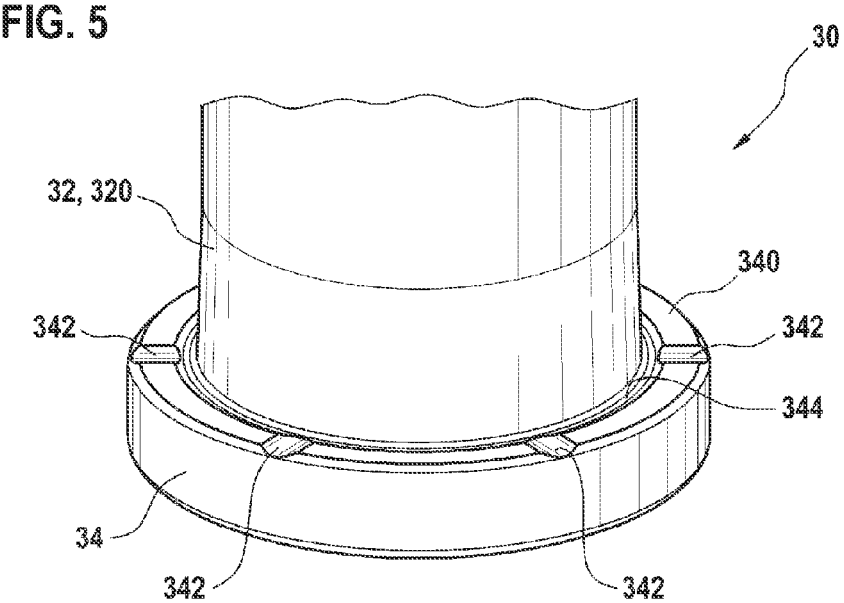
FIG. 5 shows a perspective view of a first embodiment of a bushing according to the invention.
Figure 6:
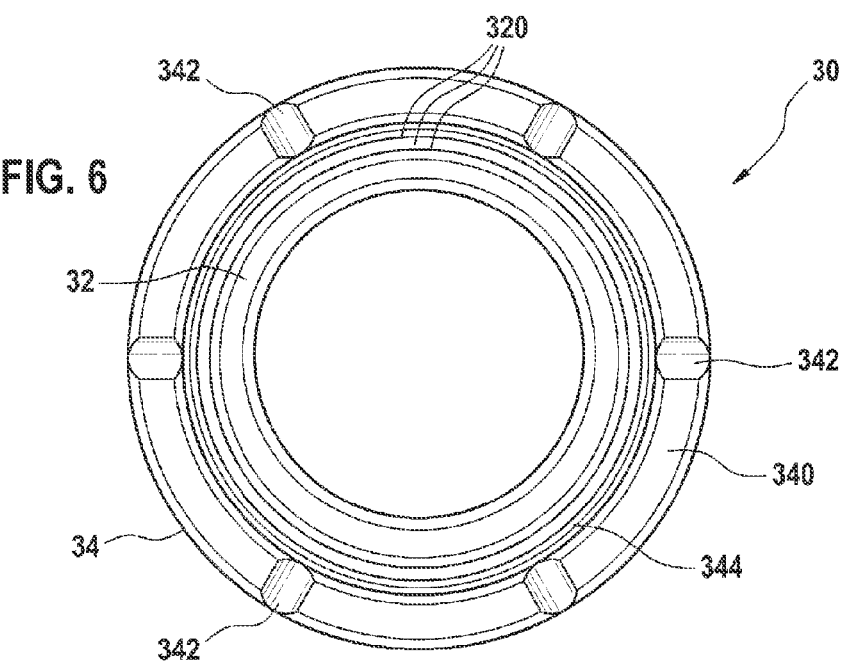
FIG. 6 shows a top view of the bushing according to the invention from FIG. 5.

FIGS. 5 and 6 show the first embodiment of the invention for counteracting the last-mentioned problem of the capillary effect in the collar region. According to the invention, at least one relief channel 342, preferably however a plurality of relief channels 342, is provided in the collar 340. Said relief channels 342 can be designed, e.g., as a groove or an impression. In so doing, such a relief channel 342 functions as a capillary relief channel 342. Inside at a transition region from the flange section 34 to the mounting section 32, an annular channel 344 is provided in said flange section 34 and/or in said mounting section 32. Water can collect in the annular channel 344 and can flow from there into the relief channel 342, which runs substantially in the radial direction.

Figure 7:
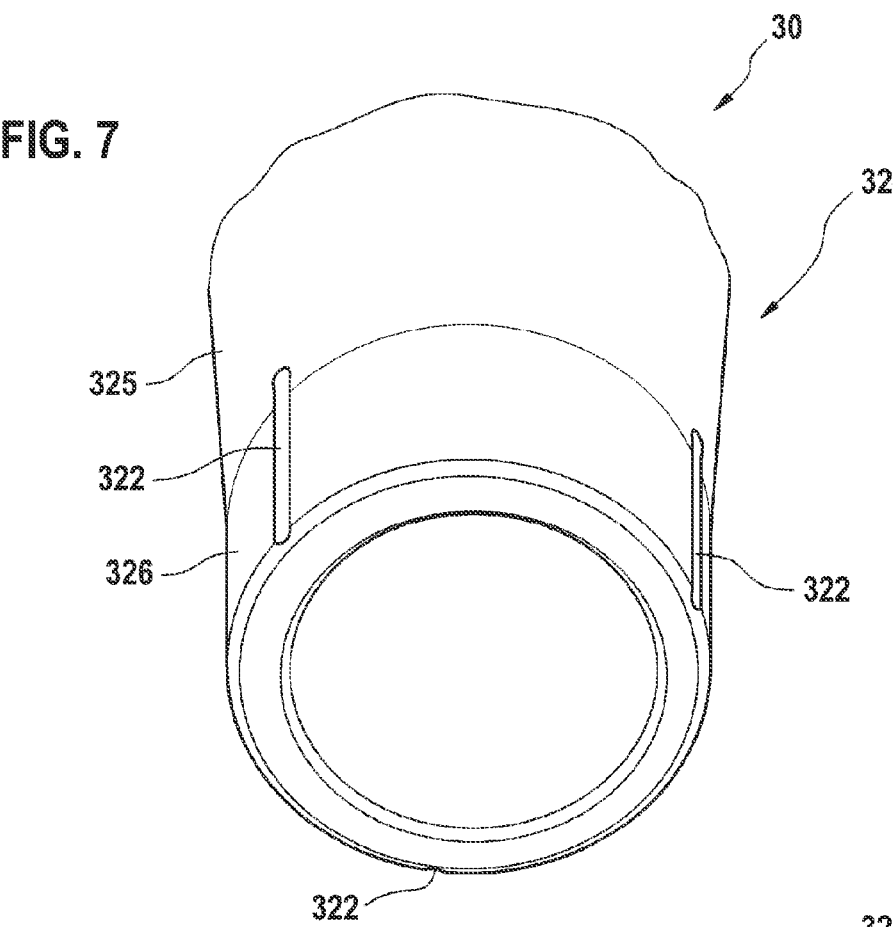
FIG. 7 shows a perspective view of a second embodiment of the bushing according to the invention.
Figure 8:
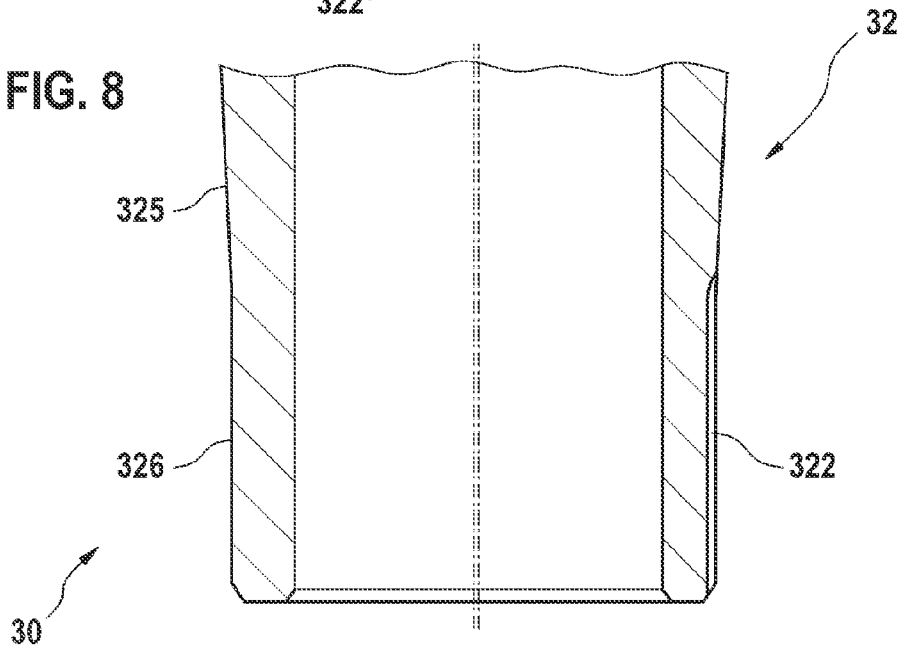
FIG. 8 shows a sectioned side view of the bushing according to the invention from FIG. 7.

FIGS. 7 and 8 show the second embodiment of the invention for counteracting the first-mentioned problem of the enclosed air volume in the space 40. In the second press region 326 of the eccentric bushing 30, provision is made according to the invention for at least one relief channel 322, preferably however three relief channels 322. Said relief channels 322 can, e.g., be in turn configured as a groove or as an impression. In so doing, such a relief channel 322 functions as a pressure relief channel 322. The relief channel 322 preferably extends from a free end of the second press region 326 into the intermediate region 325. It is preferable in this case for the relief channel 322 to run in a straight line and parallel to a longitudinal axis of the eccentric bushing 30. Such longitudinally configured relief channels 322 furthermore provide the advantage that the eccentric bushing 30 is linearly guided during mounting and has less of a tendency to twist during the mounting operation.

Both embodiments of the invention can also be applied to non-stepped bushings 30 or respectively non-stepped eccentric bushings, which relates particularly to the first embodiment.

The invention claimed is:

1. A wiper drive (1) for windshield wipers of a motor vehicle, comprising a housing component (1) and an eccentric bushing (3) having an axial mounting section (32) and a radial flange (34) protruding therefrom, wherein the bushing (30) is mounted in the housing component (1), characterized in that the bushing (30) has a relief channel (342) such that a fluid can flow through the relief channel (342), wherein the relief channel (342) is provided in a collar (340) of the flange section (34) facing said mounting section (32), and wherein an annular channel (344) is provided, at a transition from the flange section (34) to the mounting section (32), in one of the collar (340) and the mounting section (32), said annular channel being in fluid connection with the relief channel (342).

2. The wiper drive according to claim 1, wherein a second relief channel (322) is provided in an outer face (320) of the mounting section (32).

3. The wiper drive according to claim 2, wherein the second relief channel (322) is provided in a contact region of the mounting section (32) with the component (1).

4. The wiper drive according to claim 2, wherein the second relief channel (322) runs parallel to a longitudinal axis of the bushing (30) and vents the first space (40) between the bushing (30) and the component (1).

5. The bushing according to claim 2, wherein the second relief channel (322) is provided in a press region (326) of the mounting section (32) with the component (1), and said second relief channel (322) runs substantially parallel to the longitudinal direction of said mounting section (32).

6. The bushing according claim 2, wherein the second relief channel (322) is provided in a press region (326) of the mounting section (32) with the component (1).

7. The bushing according to claim 6, wherein the second relief channel extends across an entire length of the press region.

8. The wiper drive according to claim 1, wherein the mounting section (32) adjacent to the flange section (34) comprises a first press region (324) and a second press region (326) on a free longitudinal end section thereof, said second press region having a smaller diameter than the first press region (324).

9. The wiper drive according to claim 1, wherein the relief channel (342) of the flange section (34) is a capillary relief channel (342), through which a capillary between the collar (340) of the bushing (30) and the component (1) can be drained.

10. The wiper drive according to claim 1, wherein the relief channel (342) is a groove carved out of the material of the bushing (30) or a recess introduced into the material of the bushing (30).

* * * * *